June 4, 1929.	R. SCHILDENFELD	1,715,517
SCANNER FOR PICTURE TRANSMISSION
Original Filed Aug. 6, 1927
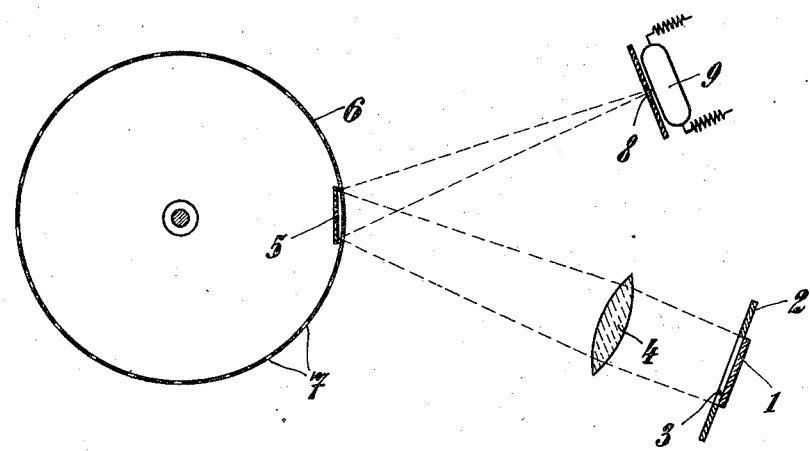
Inventor
Rudolf Schildenfeld
by
Attorney Patented June 4, 1929.

1,715,517

UNITED STATES PATENT OFFICE.

RUDOLF SCHILDENFELD, OF VIENNA, AUSTRIA.

SCANNER FOR PICTURE TRANSMISSION.

Original application filed August 6, 1927, Serial No. 211,040, and in Austria August 10, 1926. Divided and this application filed June 29, 1928. Serial No. 289,124.

This invention relates to a scanner for picture transmission by means of photo-electric cells. Thereby the image is analyzed in two directions in the usual way, by a primary splitting up into parallel image stripes or sections and a secondary splitting up of each stripe into image-spots. The rays of light successively passing from the individual image-spots influence in known manner a photo-electric cell, which produce the impulses of current to be transmitted. The object of the present invention is a most simple construction of the arrangement for analyzing an image.

One mode of carrying out the present invention is illustrated diagrammatically and by way of example in the accompanying drawing.

In front of the image 1, which in the present case is in the shape of an illuminated transparent picture (diapositive, film) or of a ground glass image of a camera, is disposed a slit-diaphragm 2 adapted to move parallel to the face of the image, e. g. at a right angle with respect to the surface of the drawing, and leading past in front of the image a slit 3. Thereby the image is primarily split up into image-stripes, the light of which is directed by way of an optical device 4 onto a fixed mirror 5. The marginal rays of the flat beam of light are indicated by dotted lines. A cylindric drum 6, which rotates about an axis disposed vertically with respect to the image-stripe projected onto the mirror and which is provided with slits 7 disposed parallel with respect to the axis of rotation, is arranged in such a manner, that the mirror 5 is located close to the inside of the said drum. A slit 7 moving in front of the mirror 5 secondarily splits up the image-stripe just projected onto the mirror into individual image-elements substantially in the shape of points, the light of latter being successively projected through the slit 7 and a point diaphragm 8 onto a photo-electric cell 9. Of course the mirror has to be suitably curved in order that all rays of light projected by it successively pass through the hole of the diaphragm. The first and the last of these rays of light are indicated in the drawing. After the last ray of light of an image-stripe follows the first ray of light of the next image-stripe, which is already secondarily split up by the next slit 7. The distance between the slits 7 depends on the width of the flat beam of rays during its passage through the drum. The diameter of the drum 6 can be reduced to such an extent that the arrangement is handy by providing a suitable optical device or by disposing the image 1 a suitable distance away from the drum 6.

In consequence thereof the size of the picture to be transmitted is quite immaterial, because by a suitable distance of the drum from the image for instance a minimum distance of three millimetres of the drum-slits can be readily observed.

Instead of using a separate fixed mirror, the outside of the solid drum may be made reflecting and covered with a not transparent coating, which is made transparent for instance by scratches or slits at the places corresponding to the slits first mentioned. It is already known to employ slit-diaphragms moving in a straight line, slit-drums, perforated driving belts and the like for splitting up images. Compared with these known arrangements, the construction according to the invention possesses the advantage of simplicity and adaptability to the prevailing conditions. Owing to the combination of the slit-diaphragm 2 with the image-carrier and the avoidance of movable parts near the photo-electric cell, the only movable part is the drum 6 together with the mirror and for their positioning ample scope is safeguarded.

I claim:—

1. Scanner for picture transmission comprising in combination a photo-electric cell, a point-diaphragm in front of the same, a mirror disposed opposite and some distance away from the same, a drum rotating closely in front of the mirror and provided with slits arranged parallel with respect to the shaft of the drum, an optical objective device and a diaphragm arranged in front of the picture to be transmitted, the said diaphragm being adapted to move parallel with respect to the axis of the drum, a slit in the diaphragm, the said slit being disposed vertically with respect to the direction of movement of the diaphragm, in order that the beam of rays passing from the image is split up into stripes and the latter into points, which are successively projected by the mirror through the point-diaphragm and onto the photo-electric cell.

2. Scanner for picture transmission comprising in combination a photo-electric cell, a point-diaphragm in front of the same, a mirror disposed opposite and some distance away from the same, a drum rotating closely in front of the mirror, the drum being made reflecting and covered with a not transparent coating which is removed at cetrain places only to render it transparent, an optical objective device and a diaphragm arranged in front of the picture to be transmitted, the said diaphragm being adapted to move parallel with respect to the axis of the drum, a slit in the diaphragm, the said slit being disposed vertically with respect to the direction of movement of the diaphragm, in order that the beam of rays passing from the image is split into stripes and the latter into points, which are successively projected by the mirror through the point-diaphragm and onto the photo-electric cell.

In testimony whereof I affix my signature.

RUDOLF SCHILDENFELD.